Aug. 3, 1965  A. N. IKNAYAN ETAL  3,198,679
RECAPPING BUTYL TIRES
Filed Sept. 11, 1961
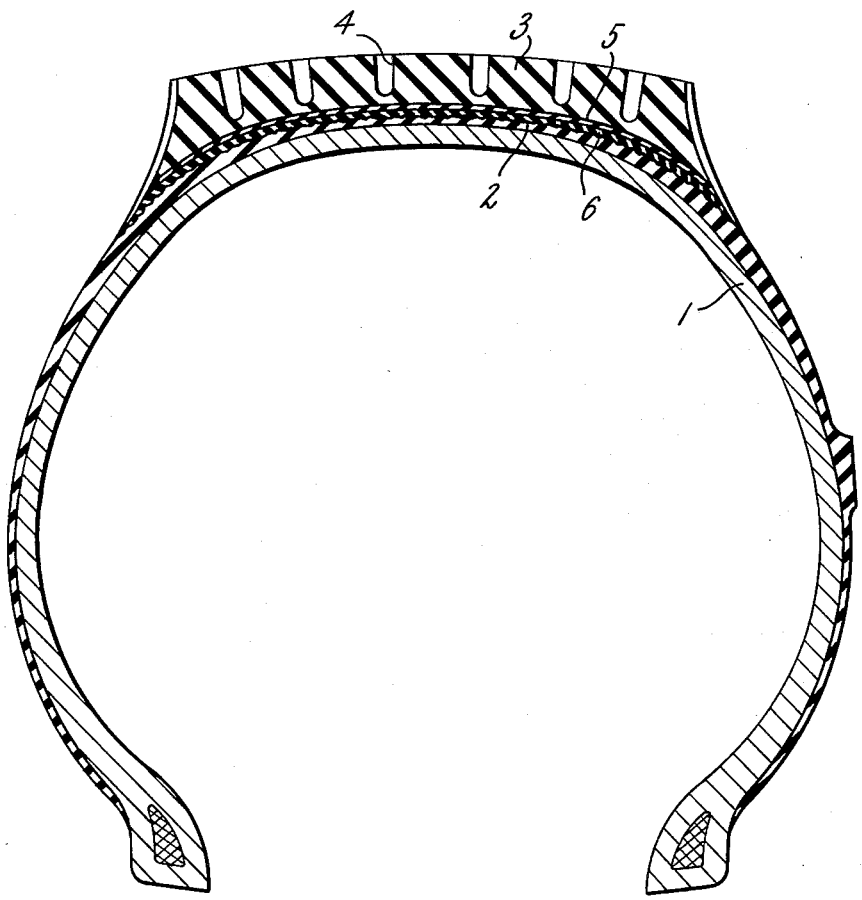
INVENTORS
ALFRED N. IKNAYAN
ALBERT S. TAVENOR
BY James J. Long
AGENT

United States Patent Office

3,198,679
Patented Aug. 3, 1965

3,198,679
RECAPPING BUTYL TIRES
Alfred N. Iknayan and Albert S. Tavenor, both of Indianapolis, Ind., assignors to United States Rubber Company, New York, N.Y., a corporation of New Jersey
Filed Sept. 11, 1961, Ser. No. 137,386
10 Claims. (Cl. 156—96)

This invention relates to a method of adhering uncured highly unsaturated rubber to cured butyl rubber, and more particularly it relates to recapping butyl rubber tires with non-butyl treads, as well as to improved cured laminates of highly unsaturated rubber to butyl rubber, characterized by improved adhesion.

Relatively recently pneumatic tires made of butyl rubber have appeared on the market in increasing numbers. Butyl rubber, as is well known, is a kind of synthetic rubber made by copolymerizing an isoolefin such as isobutylene with a conjugated diolefin such as isoprene, and it is characterized by the fact that it contains a relatively low degree of unsaturation (it usually contains not more than 10 or 15% by weight of the diolefinic component, frequently less than 3%, and even lower such as 0.5%). When such tires become worn it is frequently desired to recap them by applying conventional recapping materials and vulcanizing and curing such recapping materials to the old tire. Such recapping materials are based on a highly unsaturated rubber compounded for vulcanization. We have found that recapped butyl tires made in this way unfortunately are not always entirely satisfactory. In fact, as a result of examination of a large number of recapped butyl tires and after careful analysis of the causes and types of failures encountered in such tires, we have concluded that the adhesion of new treads based on highly unsaturated rubber to butyl tires is frequently far below the standard that would be desirable.

We have devoted our efforts to finding a way of ameliorating the foregoing difficulty, and we have now discovered, most suprisingly, that if there is interposed, between the cured butyl tire and the uncured new vulcanizable tread material based upon a highly unsaturated rubber, an intermediate layer or tie gum of uncured highly unsaturated rubber containing no curatives or insufficient curatives to effect full vulcanization, the adhesion of the new tread upon vulcanization is unexpectedly greatly improved.

By highly unsaturated rubber we mean a rubber or elastomer containing at least 25% by weight of a conjugated diolefinic component, such as isoprene or butadiene. Such rubbers are typified by natural (Hevea) rubber, SBR (styrene-butadiene), polyisoprene and polybutadiene (especially the highly rubbery cis form of the latter two polymers), as well as such copolymers as butadiene-vinylpyridine copolymer or butadiene-styrene-vinylpyridine copolymer. Mixtures or such elastomers with each other, or with other suitable elastomers such as polychloroprene, may be used in the intermediate layer (tie gum) of the invention, and in the tread material.

While it is not desired to limit the invention to any particular theory of operation, we believe that the use of a special intermediate layer or tie gum, in accordance with the invention, containing no curatives, or insufficient curatives to fully vulcanize such layer, results in improved adhesion because such intermediate layer is not readily subject to over-cure, or reversion, as a result of residual curatives migrating or diffusing out of the cured butyl tire. It will be understood that cured tires, even tires which have been in service for some time, still contain appreciable quantities of substances capable of causing vulcanization. Such substances are residual curatives remaining from the original vulcanizing agents or accelerators introduced in the manufacture of the tire and/or they are decomposition products or derivatives of such vulcanizing agents and accelerators which still have definite curing capacity. These ingredients are "migratory," that is, they are soluble in rubber and are capable of diffusing or moving about within the stock, or even moving from one stock to an adjacent stock, especially at vulcanizing temperatures. If a cured butyl tire is recapped in accordance with conventional practice by vulcanizing uncured recapping materials on the butyl tire, the extra curatives diffusing out of the tire into the recapping material can cause a seriously over-cured condition at the interface with the result that the stock at the interface tends to be weak and have poor physical properties so that a strong, reliable adhesive bond is not obtained. In accordance with the invention, we obviate this difficulty by providing an extra intermediate layer, or special tie gum, of stock which does not tend to become over-cured because it contains no curatives or relatively little curative, and therefore is not harmed by any extra curative diffusing into it from the tire. The intermediate interface thus provided by the invention therefore has excellent physical properties and furnishes a strong, permanent bond that persists throughout a long period of service, even under the influence of the intense rapid flexing and high internal temperatures encountered in use.

The invention will be described in more detail with reference to the accompanying drawing, the single figure of which represents, in purely diagrammatic fashion, a cross-sectional view of a recapped butyl rubber tire embodying a special tie gum between the recapping material and the old tire, in accordance with the invention.

Referring to the drawing, the used, cured butyl rubber tire 1 shown therein may be any conventional butyl rubber tire and contains the normal residual migratory curing ingredients (typically sulphur, organic accelerators of sulphur vulcanization, e.g., tellurium diethyl dithiocarbamate or benzothiazyl disulfide) or decomposition products thereof, zinc oxide, stearic acid, and the like, in conventional amounts. A specific example of a typical butyl rubber tire composition is as follows:

| | Parts by weight |
|---|---|
| Isoprene-isobutylene rubber (about 2–2.5% isoprene) | 100.00 |
| Carbon black | 40.00 |
| N-methyl-N,4-dinitrosoaniline | 0.33 |
| Zinc oxide | 5.00 |
| Petroleum oil softener | 12.50 |
| Phenol-formaldehyde resin | 2.50 |
| Phenyl-beta-naphthylamine (antioxidant) | 1.00 |
| Sulfur | 2.00 |
| Tellurium diethyl dithiocarbamate (accelerator) | 1.25 |
| Benzothiazyl disulfide (accelerator) | 1.00 |

Such a composition is substantially fully vulcanizable under the conditions normally used for curing pneumatic tires. However, in spite of such "full" or "substantially complete" vulcanization in the course of manufacturing the tire, there will be, in ordinary practice, appreciable amounts of remaining curatives, such as vulcanizing agent, accelerator and the like, or decomposition products thereof, which still have latent vulcanizing ability, and which are "migratory," or capable of diffusing from one part of the stock to another, or even into an adjacent rubber stock. Those skilled in the art will understand that considerable variation in a butyl rubber tire formulation of the foregoing type, and in the curing conditions, is permissible in practice.

Preparatory to recapping, the old tread (not shown)

is buffed off the used butyl tire 1 in the usual manner leaving a surface 2 of a proper contour on which to apply the recapping materials. The recapping assembly includes a conventional outer tread member 3, which represents the actual wearing surface of the tire and in which the usual pattern of grooves 4 or the like is molded during the recapping, as well as a conventional undertread portion or "cushion gum" 5 which is generally similar to the tread stock but is made up of a somewhat more tacky, and less abrasion resistant stock than the tread itself. A relatively thin layer (e.g., 0.010 to 0.060 inch) of the special tie gum 6 of the invention is interposed between the undersurface of the cushion stock 5 of the recapping assembly and the buffed surface 2 of the old butyl tire.

The recapping material, that is, the tread 3 and particularly the cushion gum 5, are based on a highly unsaturated rubber as previously defined compounded for normal vulcanization in the usual way, using sufficient sulfur or equivalent curative and sufficient organic accelerator of sulfur vulcanization to produce a substantially full or complete cure as required to provide good tire tread and cushion gum properties under the curing conditions used for recapping, e.g., heating to a temperature of from 275° to 330° F. for a period of from 40 minutes to 8 hours, it being understood that the time and temperature of cure are in general inversely related and may vary considerably depending on such factors as the size of the tire, the exact formulation used, the character of the heating device, etc.

An example of a suitable stock for the tread portion 3 and an example of a suitable stock for the undertread or cushion 5, are as follows:

|  | Parts by weight | |
|---|---|---|
|  | Thread Stock A | Cushion Stock B |
| Smoked sheet natural rubber | | 85.00 |
| SBR rubber (23% styrene) | 100.00 | 15.00 |
| Zinc oxide | 5.00 | 5.00 |
| Carbon black (furnace) | 60.00 | 50.00 |
| Salicylic acid (retarder) | | .25 |
| Antioxidant (e.g. acetone-diphenyl amine condensation product) | 1.00 | .50 |
| Petroleum oil softener | 30.00 | 15.00 |
| Stearic acid | 3.00 | |
| Accelerator (e.g., N-oxydiethylene benzothiazole-2-sulfenimide) | 1.25 | 1.00 |
| Accelerator (diphenyl guanidine) | .50 | .20 |
| Sulfur | 2.00 | 2.50 |

Both the tread stock and the cushion stock are conventional, and it will be understood that they can be based upon any of the highly unsaturated diolefinic polymer rubbers mentioned previously, or mixtures thereof, and it will be appreciated that those skilled in the art will be able to make wide variations in the formulations shown, with equivalent results. It is a characteristic of the tread stock that it contains a sufficient proportion of a reinforcing filler, such as carbon black, silica, lignin, or the like, to permit such stock to achieve a relatively high degree of abrasion-resistance. The cushion stock is generally similar, but may contain a lesser proportion of reinforcing filler. Both of these stocks are compounded, as indicated, in such a manner as to achieve a full state of vulcanization, or a substantially complete vulcanization, under the conditions employed in recapping.

In accordance with the invention the special tie gum layer 6, which is interposed between the outer surface 2 of the cured butyl tire and the under surface of the cushion gum 5 of the recapping material, is compounded from a highly unsaturated rubber, as previously defined, in a manner generally similar to the cushion gum 5 with the important exception that we deliberately use an insufficient quantity of vulcanizing ingredients, preferably no vulcanizing ingredients at all, so that this tie gum 6 is inherently incapable, of itself, of becoming substantially fully or completely vulcanized. Specific examples of suitable unvulcanizable or incompletely vulcanizable tie gum compositions for use in the invention are as follows:

|  | Parts by weight | |
|---|---|---|
| Ingredients | Tie Gum Stock C | Tie Gum Stock D |
| Smoked sheet natural rubber | 85.00 | 85.00 |
| SBR rubber (23% styrene) | 15.00 | 15.00 |
| Zinc oxide | 5.00 | 5.00 |
| Carbon black (furnace) | 50.00 | 50.00 |
| Salicylic acid (retarder) | .25 | .25 |
| Antioxidant (e.g., acetonediphenyl amine condensation product) | .50 | .50 |
| Petroleum oil softener | 9.62 | 9.62 |
| Accelerator (e.g., N-oxydiethylene benzothiazole-2-sulfenimide) | 1.00 | |
| Sulfur | 1.00 | |

Those skilled in the art of compounding rubber will understand that the formulation of the tie gum can be varied in numerous ways while still providing the essential feature that is be unvulcanizable, or at least not capable of achieving a substantially complete state of vulcanization under the conditions used in recapping. This can be accomplished by eliminating both the vulcanizing agent and the accelerator, as illustrated in composition D above, or it can be accomplished by using a reduced amount of vulcanizing ingredients, particularly the vulcanizing agent, compared to what would be required for an essentially full state of vulcanization, as in recipe C, above. For purposes of the invention, the tie gum stock will ordinarily contain not more than 1.5 parts of accelerator (per 100 parts of rubber), and preferably not more than 1 part of sulfur, or its substantial equivalent in the form of sulfur donning materials such as tetramethyl thiuram disulfide, or equivalent sulfur-type vulcanizing agent. Still more preferably the tie gum will contain no vulcanizing agent or accelerator.

When we say that the tie gum employed in the invention is only partially vulcanizable, or only incompletely vulcanizable, we mean that it contains insufficient vulcanizing ingredients to produce the level of physical properties that would be regarded as a full cure, under the conditions employed in recapping. Thus, a tie gum stock formulated in accordance with the invention, if subjected to the curing conditions employed in recapping, would of itself typically develop a Shore hardness (A scale) of from about 20 to 40 a modulus at 300% elongation of from about 50 to 700 p.s.i., a tensile strength of about 600 to 2000 p.s.i., and an elongation at break of from about 600 to 1100% or more. In contrast to this, an otherwise similar stock compounded for substantially full vulcanization such as for example a cushion gum stock, would typically achieve, when subjected to the curing conditions employed in recapping, a Shore (A scale) hardness of from about 45 to 65, a modulus at 300% elongation of from about 800 to 2000 p.s.i., a tensile strength of from about 2500 to 3500 p.s.i., and an elongation at break of from about 400 to 650%.

The difference between the tie gum formulated in accordance with the invention and a similar stock compounded for conventional vulcanization will be apparant by comparing the vulcanizing ingredients in stock C above with the vulcanizing ingredients that would be required to produce a conventional state of complete vulcanization in an otherwise similar stock, as follows:

Sulfenimide accelerator _ 0.85–1.00 (parts per 100 parts by weight of rubber).
Diphenyl guanidine _____ 0.20.
Sulfur _____ 2.50.

In practicing the invention, the uncured vulcanizable tread 3, the uncured vulcanizable cushion stock 5, and the uncured, unvulcanizable or only slightly vulcanizable tie gum 6 are superimposed as described on the buffed surface 2 of the cured butyl tire. It will be understood that the various layers 3, 5 and 6 are previously formed in approximately the desired shape, for example by extrusion or calendering, and strips of such stocks of appropriate length are superimposed in the desired positions on the cured tire that is desired to recap. The whole assembly is then disposed in the usual recapping mold (not shown) which is adapted to heat the assembly to proper vulcanizing temperatures, while applying pressure to the assembly and while molding the tread in the desired form. It is surprisingly found that a remarkably strong adhesive bond develops between the cushion stock 5 and the surface 2 of the cured butyl tire, through the agency of the described unvulcanizable or slightly vulcanizable tie gum layer 6. This is in direct contrast to the results obtained is the recapping operation is performed without the special tie gum 6 present, that is, with the cushion gum 5 in direct contact with the surface 2 of the cured butyl tire, in which case the adhesion is unsatisfactory, and early failure of the recapped tire by separation at this interface can be expected. A certain amount of curatives diffuse out of the adjacent cushion stock and carcass into the special tie gum of the invention, causing it to become sured sufficiently to develop good physical properties and a strong adhesive bond, without becoming over-cured and weak as in conventional practice.

In order to demonstrate the advantages of the invention in this respect, three series of recapped butyl tires were prepared. In the first series, the cured butyl tires were recapped, using tread stocks and cushion stocks formulated as illustrated above, without any intermediate tie gum of the invention, the curing conditions during the recapping involving heating at a temperature of about 293° F. for about 70 minutes. In the second series, the same procedure was followed, except that a tie gum formulated in accordance with recipe C, above, was inserted between the cushion gum and the cured tire. In the third series, the cushion gum of recipe D above was employed in a similar manner. The resulting three series of recapped tires were tested on a cleated test wheel at 45 miles per hour, with the results shown in Table I, below. Also, adhesion tests were performed to test the strength of the adhesive bond, in pounds, at the interface between the intermediate tie gum and the butyl tire in the case of series 2 and series 3, and between the cushion gum and the butyl tire in the case of series 1. These adhesion tests are carried out both at 70° F. and at an elevated temperature of 250° F., because the elevated temperature test is a much more severe test, and is believed to be more indicative of the performance to be obtained in actual use of the tire, where considerable heat is generated. The results are summarized in Table I.

*Table I*

| Test | Series 1 | Series 2 | Series 3 |
| --- | --- | --- | --- |
| Adhesion at 72° F. (pounds) | 42.0 | 76.0 | 60.0 |
| Adhesion at 250° F. (pounds) | 6.0 | 9.0 | 11.5 |
| Life on cleated test wheel at 45 m.p.h. (hours) | ¹ 4.8 | ² 13.6 | ³ 26.7 |

¹ Average of 17 wheel tests. All failures from tread separations at the subject interface.
² Average of 9 tests. Primarily tread separations. One tire removed unfailed at 18.5 hours.
³ Average of 2 tests. One tire failed from separation other than at the subject interface.

It will be apparent that cured butyl tires recapped in accordance with this form of the invention are indeed remarkable for the strength of the adhesive bond between the recapping materials and the butyl tires.

It will be understood that the references to "recapped" tires or "recapping" as used herein include retreading or any similar repairing or renovation of a cured butyl rubber article by applying vulcanizable highly unsaturated rubber thereto and adhering same with the aid of the unvulcanizable or partially vulcanizable tie gum of the invention.

If desired, the cushion gum 5 can be omitted, and the tread stock 3 and/or the tie gum 2 of the invention may be made correspondingly thicker, in which case the tie gum serves as the bonding medium directly between the tread 3 and the surface 2 of the cured butyl tire 1.

Having thus described our invention, what we claim and desire to protect by Letters Patent is:

1. In a method of recapping a used tire made of sulfur-cured isobutylene-isoprene copolymer rubber containing 0.15-15% isoprene wherein an unvulcanized recapping material, comprising a highly unsaturated rubbery polymer containing at least 25% of a diolefin selected from the group consisting of butadiene and isoprene compounded for complete vulcanization with sulfur when heated at a temperature of 275°–330° F. for a period of 40 min. to 8 hours, is applied to said cured tire and subjected to the just-mentioned vulcanizing conditions, whereby the tire is recapped with said highly unsaturated rubbery polymer, the improvement comprising interposing, between the surface of the cured tire to be recapped and said recapping material, a layer of tie gum comprising a highly unsaturated rubbery polymer as previously defined a containing a vulcanizing and accelerating ingredient equivalent to not more than 1 part of sulfur and not more than 1.5 parts of an accelerator of sulfur vulcanization per 100 parts of rubbery polymer in the tie gum, whereby the tie gum is not more than partially vulcanizable under the previously mentioned vulcanizing conditions, the said tie gum being interposed before carrying out the said vulcanization, whereby the adhesion between the said recapping material and the cured tire is enhanced, the said parts and percentages being by weight.

2. A method as in claim 1, in which said tie gum comprises natural rubber.

3. A method as in claim 1, in which said tie gum comprises butadiene-styrene copolymer rubber.

4. A method as in claim 1, in which said tie gum comprises a mixture of natural rubber and butadiene-styrene copolymer rubber.

5. A method as in claim 4, in which said recapping material is made up of a tread stock layer comprising butadiene-styrene copolymer rubber and a cushion stock layer disposed on the underside of the tread stock layer and in contact with the tie gum layer, said cushion stock layer comprising a mixture of natural rubber and butadiene-styrene copolymer rubber.

6. In a method of recapping a used tire made of sulfur-cured isobutylene-isoprene copolymer rubber containing 0.5–15% isoprene wherein an unvulcanized recapping material, comprising a highly unsaturated rubbery polymer containing at least 25% of a diolefin selected from the group consisting of butadiene and isoprene compounded for complete vulcanization with sulfur when heated at a temperature 275°–330° F. for a period of 40 min. to 8 hours, is applied to said cured tire and subjected to the just-mentioned heating conditions, whereby the tire is recapped with said highly unsaturated rubbery polymer, the improvement comprising interposing, between the surface of the cured tire to be recapped and said recapping material, a layer of tie gum comprising a highly unsaturated rubbery polymer as previously defined containing no vulcanizing and accelerating ingredients whereby the tie gum is unvulcanizable under the previously mentioned heating conditions, the said tie gum being interposed before carrying out the said heating, whereby the adhesion between the said recapping material and the cured tire is enhanced, the said percentages being by weight.

7. A method as in claim 6, in which the said tie gum comprises natural rubber.

8. A method as in claim 6, in which said tie gum comprises butadiene-styrene copolymer rubber.

9. A method as in claim 6, in which said tie gum comprises a mixture of natural rubber and butadiene-styrene copolymer rubber.

10. A method as in claim 9, in which the said recapping material is made up of a tread stock layer comprising butadiene-styrene copolymer rubber and a cushion stock layer disposed on the underside of the tread stock layer and in contact with the tie gum layer, said cushion stock layer comprising a mixture of natural rubber and butadiene-styrene copolymer rubber.

References Cited by the Examiner

UNITED STATES PATENTS

| | | | |
|---|---|---|---|
| 2,459,757 | 1/49 | Smith | 156—96 XR |
| 2,925,407 | 2/60 | Goldberg | 260—83.3 |
| 2,981,304 | 4/61 | Barton et al. | 156—129 |
| 3,019,148 | 1/62 | Hausch | 156—338 XR |

ALEXANDER WYMAN, *Primary Examiner.*

EARL M. BERGERT, HAROLD ANSHER, *Examiners.*